United States Patent

London

Patent Number: 5,728,216
Date of Patent: Mar. 17, 1998

[54] CONTINUOUS TUMBLE COATING AND BREADING APPARATUS

[75] Inventor: Eugene J. London, Sandusky, Ohio

[73] Assignee: Stein, Inc., Sandusky, Ohio

[21] Appl. No.: 618,553

[22] Filed: Mar. 20, 1996

[51] Int. Cl.$^6$ ............................................. A23G 3/00
[52] U.S. Cl. ......................... 118/13; 118/19; 118/30; 118/417; 118/423; 99/494; 198/715
[58] Field of Search ............................ 118/13, 19, 30, 118/417, 423; 426/289, 292, 519; 99/494; 198/715, 384

[56] References Cited

U.S. PATENT DOCUMENTS

| | | | |
|---|---|---|---|
| 2,017,046 | 10/1935 | Hanna et al. | 198/715 |
| 3,342,306 | 9/1967 | Fabbri | 198/715 |
| 5,238,493 | 8/1993 | Miller | 118/13 |
| 5,463,938 | 11/1995 | Sarukawa et al. | 99/494 |

Primary Examiner—Laura Edwards
Attorney, Agent, or Firm—Oldham & Oldham Co., L.P.A.

[57] ABSTRACT

A machine for tumble-coating food or other product with a coating material comprises a product conveyor belt and a carrier conveyor system, which underlies and supports at least a portion of the upper run of the product conveyor belt in a tumble or processing zone. The product conveyor belt and the carrier conveyor system work in conjunction with one another to allow the product conveyor to sag between a pair of adjacent, spaced-apart support rollers on the carrier conveyor system, forming a tumble chamber. Products captured in the tumble chamber are coated with a charge of coating material introduced into the tumble chamber. The formed tumble chambers are moved along as the product conveyor is driven, and products within the chambers are continuously tumbled and moved within the coating material to achieve excellent coating or breading characteristics and appearance. For the breading or other coating of food products, the machine and methods of the invention can produce unique "homestyle" coating appearances and textures.

14 Claims, 3 Drawing Sheets

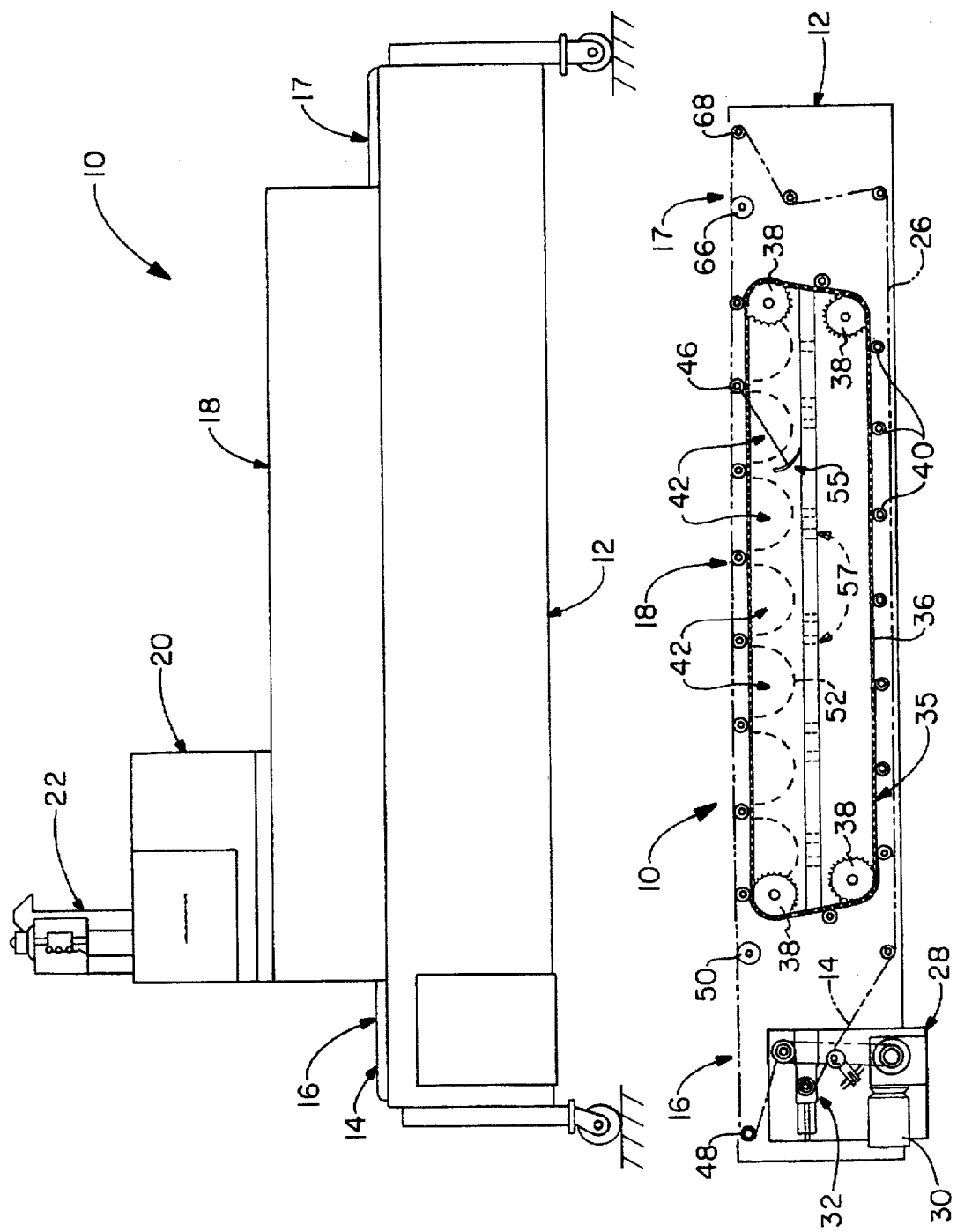

CONTINUOUS TUMBLE COATING AND BREADING APPARATUS

The present invention relates to an apparatus for applying a coating, particularly a coating of a granular or pulverulent material, to a food product. More specifically, the present invention relates to an apparatus which combines the advantages of a batch tumble-type coating process with the continuity of a conveyor belt-type process.

BACKGROUND OF THE ART

In the food processing industry, it is in many cases desirable to selectively dispense a breading or other coating material onto a food product in a manner which thoroughly and adequately coats the food products. A large variety of various food products are machine-coated with batter, breading or the like before being fried or cooked and packaged for purchase by a consumer. The coating materials used to coat such food products may be breading comprising dry farinaceous materials which may take many forms, but will normally include grain flour in some form. The breading material may also include seasonings, spices, shortening, etc., to form a coating which adds flavor and texture to the product. Other coating material such as ground cereal, dried vegetables or the like may be used as desired. Most breading materials may be roughly classified by their appearance into one of three classes, including flour breading, free flowing breading, or Japanese-style crumbs. Each of these various breading materials have their own peculiarities which may affect the design of a machine adapted to apply the breading material to food pieces. As an example, flour breading, which consists of finely ground dust-like particles, may have a tendency to pack under pressure, thereby increasing the chance that flow of the breading material within a coating machine will become inhibited due to congestion or packing of the breading material. Additionally, with a flour breading, a problem may exist with adequately distributing the breading material within the breading machine to achieve the desired coating characteristics uniformly for all food products introduced into the machine.

Similarly, the breading classified as free flowing usually comprise reasonably hard and roughly spherical particles ranging in size from dust to about 2/32 on an inch in diameter and may be crackermeal or the like. A problem may exist with adequately distributing free flowing breading material within the coating machine while preventing leakage of the breading material from the coating machine. The Japanese style crumbs consist of a modified wheat flour with small percentages of yeast, salt, sugar, vegetable oil and other additives. The Japanese style crumbs appear to be dried shredded white bread having particle sizes as large as ½ inch or as little as flour size particles with a distribution of sizes therebetween. The Japanese-style crumbs contain no uniform shape and are very delicate such that the coating machine must be able to properly handle this type of breading material to avoid degradation of the quality and particle sizes thereof.

Regardless of the specific breading selected, it is a primary concern to produce a breaded or coated food product which has an aesthetically pleasing appearance and texture. It is also an ultimate aim in the food processing industry to perform the breading operation as a continuous process, so that it may be a part of the overall continuous process of preparing the foodstuff. This is in spite of the fact that a batch-type of breading operation will generally result in a more aesthetically and gustatorially pleasing product. The batch-type of operation most commonly used would be a hollow drum or roller device, which would be charged with breading and the food products to be coated. The device would then be closed and rotated, so that the food products would be tumbled in the breading in a manner that is not unlike that which would be encountered in a manual breading operation, in which pieces of the food product would be individually handled. After a sufficient contacting time, the rotation would be stopped, the device opened and the contents removed, inspected if necessary, and passed on to further processing. A desirable appearance and texture, termed a "homestyle" coating, can be produced by drum type breading operations. Although producing a desired coating appearance and texture, particular problems encountered in a large scale tumbler unit are the size of the device and the number of pieces of the food product handled in a batch. As the size of the device becomes larger, the time required for loading and unloading becomes increasingly large, and this time is essentially dead time in terms of operation. Further, loading limitations are introduced because when a large number of pieces of food product are introduced into the device in a charge, the tumbling of the pieces against the other pieces may be detrimental to the breading process.

Other breading operations have been made continuous in the past. In such operations, the food products are typically placed on a conveyor belt and passed under a falling curtain of breading material. In many instances, such a falling curtain of breading cannot properly coat the entire food product in a single pass, and the pieces of food product must be turned or flipped, and breading reapplied to ensure an appropriate amount of breading coverage on the product. In some product configurations, a simple flipping of the product will not result in a proper coating. In addition, this type of breading operation simply can't achieve the "homestyle" coating appearance which is desired. Although deficient in these respects, the attractiveness of a continuous operation has resulted in commercial acceptance of these conveyor-belt based schemes to obtain high production rates and provide a cost effective breading operation.

An ideal breading operation would treat the food products as either individual pieces or as small groups of a few pieces, and would tumble these pieces in a sufficient amount of breading or coating material. The tumble time would be sufficient to entirely coat the pieces of food product. The process would optimally be continuous or any dead time associated with loading the pieces into the breading material, unloading the coated food products and recycling the unused breading material would be kept to an absolute minimum. A continuous operation would be supplied with food products to be coated on a continuous basis, preferably by a conveyor belt, and would discharge the coated product on a similar continuous basis, also preferably on a conveyor belt. In short, an ideal breading operation does not sacrifice the quality of coating for the sake of production speed, but instead provides a quality product in a timely and cost effective fashion.

SUMMARY OF THE INVENTION

Based upon the foregoing, there is a need to provide a coating device which can adequately handle various types of breading materials, particularly flour type breading and free flowing breading, wherein uniform and desired coating characteristics are achieved effectively and efficiently. It is of primary importance that the coating device be integrable into a continuous food processing operation. It is therefore a main object of the invention to provide a coating device having the qualities of the desired coating apparatus described above.

It is also an object of the invention to provide a coating apparatus and method which produces a "homestyle" breading appearance in a continuous operation.

These and other objects of the invention are achieved by an apparatus for tumble coating a coating material onto pieces of a food product passing therethrough. In the preferred embodiment, the machine comprises a frame or housing defining a food product conveyor path having a means for conveying food products along the conveyor path. The housing includes a food product input end and a coated food product discharge end. The food product conveyor path may be bounded on first and second sides of the conveyor path by respective first and second side walls to contain a coating material in a coating zone. Along the food product conveyor path in the coating zone is formed at least one tumble chamber which is supplied with a charge of coating material. The at least one coating chamber receives and provides tumble coating of products positioned on the conveyor as the conveyor travels between the input and discharge ends. The invention also provides a method for continuously coating pieces of a food product with a coating material, with the method comprising the steps of:

1) feeding at least one piece of the uncoated food product onto a food product input end of a food product conveyor path having a means for conveying the food product positioned thereon along the food product conveyor path;

2) forming at least one tumble chamber for coating uncoated food product positioned on the conveyor;

3) charging the at least one chamber with an amount of coating material;

4) moving the at least one chamber through a coating zone along the food product conveyor path in the direction from the input end thereof to the discharge end thereof, while tumbling food product contained therein in the charge of coating material;

5) unforming the at least one chamber at the discharge end of said food product conveyor path; and 6) discharging the coated food product previously contained in the chamber from the food product conveyor path.

BRIEF DESCRIPTION OF THE DRAWINGS

Additional objects and advantages of the apparatus and process of the present invention will become apparent to one skilled in the an after referring to the following detailed description in association with the accompanying drawings, wherein:

FIG. 1 is a schematic side elevational view of a coating apparatus in accordance with the preferred embodiment of the invention;

FIG. 2 is a partial cross-sectional view of the coating apparatus as shown in FIG. 1, with portions thereof removed for clarity;

DETAILED DESCRIPTION OF THE DRAWINGS

Figure 3:
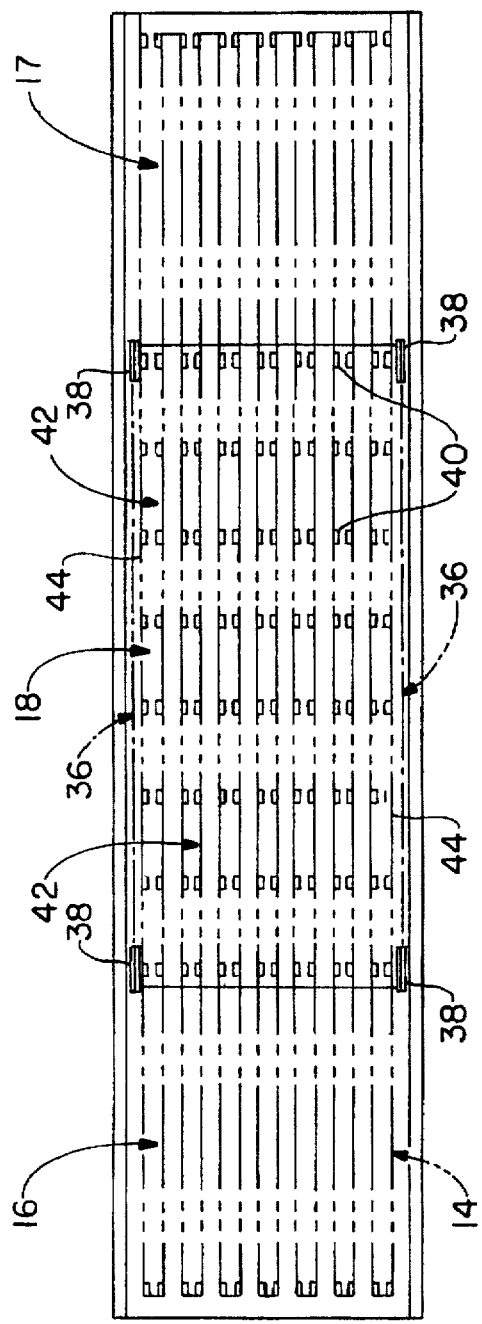
FIG. 3 is a top view of the apparatus as shown in FIG. 2.

Turning now to FIG. 1, the coating apparatus 10 of the present invention is comprised generally of an elongated frame enclosure 12 which supports a main product conveyor 14. An in-feed conveyor (not shown) or other processing machinery, such as a batter machine, will convey either battered or unbattered food product into machine 10 via an in-feed section 16 of conveyor 14. The in-feed section 16 of conveyor 14 may be provided with a layer of coating or breading material thereon, such that a bottom surface of food products placed on belt 14 will be coated therewith. Alternatively, the in-feed section 16 will merely convey food products placed thereon into a processing section, generally indicated at 18, of machine 10. The coating machine 10 also generally includes a hopper 20, which is supplied with an amount of a coating or breading material by means of a vertical screwing assembly 22. Coating material may be introduced into screw assembly 22 to be discharged from its top end for distribution to hopper 20. The hopper 20 may include a mechanism to sift coating material therein and convey it to a discharge area for dispensing onto main conveyor 14 in a process for coating products positioned on conveyor 14. Within processing section 18 of machine 10, food product introduced into machine 10 is coated by means of a unique tumbling process which will be hereinafter described in more detail. After coating within section 18, the food products are then removed from machine 10 via and exit section 17 of conveyor 14. Food product exiting machine 10 is fully coated in a manner which produces a variety of desired coating appearances and textures including a "homestyle" appearance, such as produced by a drum-type breading procedure.

It is a unique aspect of the coating machine 10 of the present invention in its handling of food products within processing section 18 of machine 10. In prior art conveyor-type coating operations, problems have been found in properly coating food products introduced into the coating machine, due to inadequate dwell time, insufficient thickness of coating material, non-uniformity of coating and the tendency for coating material to be lost subsequent to the coating operation, for example in the next stage of food preparation. Additionally, undesirable surface characteristics such as conveyor belt marks, leaching of batter material through the coating or simply an undesirable coating appearance are common problems associated with known conveyor-type coating machines. In the present invention, desirable coating characteristics are achieved by machine 10 to provide a coated food product which has a thick coating of breading having the appearance of a hand or drum coated product, and wherein the coating material is firmly set up on the food product. The coating machine 10 further provides a uniform coating of all food products introduced therein, and also inhibits the formation of conveyor belt marks or other undesirable surface characteristics on the coated food products.

Figure 4:
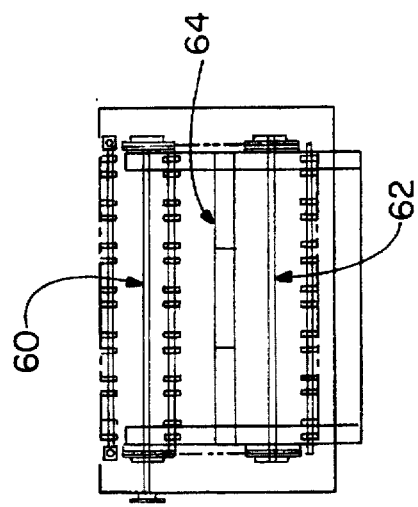
FIG. 4 is an end view of the apparatus as shown in FIG. 2.

Turning to FIGS. 2–4, a preferred embodiment of he coating apparatus of the invention will be described. As shown in FIG. 2, the conveyor 14 is made to form the in-feed section 16 and output section 17 at the first and second ends of the elongated frame 12. The conveyor 14 may be an endless product conveyor belt which forms an upper belt run including sections 16 and 17, as well as processing section 18. A lower belt run 26 may be used to circulate any excess breading material back to a recirculation system (not shown), to be fed back to screw 22 and hopper 20 for redistribution as an example. Particular coating circulation system within machine 10 may be conventional, and any suitable system may be used in conjunction with the other aspects of the invention. It is desirable that excess breading be recirculated for distribution back onto newly introduced products into coating machine 10. A drive system 28 is provided to drive conveyor 14, and may include a motor 30 and belt tensioning and drive system 32. Also supported within housing 12 is a further conveyor system, which may be referred to as a carrier conveyor system 35, which is comprised generally of a pair of parallel, spaced-apart endless drive chains 36, and a plurality of sprockets 38 on which the chains 36 are positioned. A drive mechanism for driving the chains is provided, which can be of any suitable type, and may be operated in conjunction with motor drive assembly 28 used for driving main conveyor 14. As will be hereinafter described in more detail, the drive chains 36 are preferably driven at a speed which substantially matches the speed of the conveyor 14, or at a speed which may be different from and proportional to the speed at which main conveyor 14 is driven. Also provided is a plurality of spaced-apart rollers 40 spanning the distance between the drive chains 36, with an end of each roller 40 affixed to the outer surface of one of the drive chains 36. The carrier conveyor system 35 is contained within the processing section 18 of the product conveyor system, and the two conveyor systems are driven in the same direction. The frame 12 supports the two conveyor systems 14 and 35 in relation to one another in a manner which forms a plurality of tumble coating zones or chambers 42 in processing section 18, which will be hereinafter described in more detail.

Focusing now on the carrier conveyor system 35 of the preferred embodiment, the pair of parallel, spaced-apart closed belts of drive chain 36 are preferably positioned with one such drive chain 36 running in a plane near each side edge 44 of the product conveyor belt 14, as shown in FIG. 3. The plurality of spaced-apart rollers 40 which span the distance between the drive chains 36 have ends which extend the full width of the product conveyor belt 14. In the embodiment shown in FIGS. 2–4, a first sprocket 38, which defines the path of the drive chain 36 associated therewith is positioned beneath the product conveyor belt 14 between the food product input zone 16 and the tumble zone 18. A second sprocket 38, also defining the path of the drive chain 36, is located beneath the product conveyor belt 14 between the tumble zone 18 and the discharge zone 17. Additional sprockets 38, shown in these figures, complete the drive chain path for each of the two drive chains 36. The rollers 40 which span the distance between the two drive chains 36 are positioned along the length of the drive chain at fixed, spaced-apart intervals. Each roller 40 is attached to the drive chain 36 in a manner such that the roller 40 may rotate freely about its axis even while attached. Each of the rollers 40 preferably includes end sprocket members 46 engaged in the bearings attached to the drive chains 36 to be moved along the length of the processing zone 18 while being rotatable.

Also in the preferred embodiment, the product conveyor system 14 comprises a belt which is generally conventional and appropriate for handling food products. The belt 14 is of a flexible construction, and may be constructed of previous, impervious or semi-impervious material. For example, a wire belt may be used to allow coating material to flow through the belt to achieve advantageous results in various applications. Alternatively, an impervious or semi-impervious belt may also be used to retain and carry coating material therewith. The belt in either event is configured to retain and carry the food product pieces through the machine as they are processed. The conveyor 14 may be driven at any desired speed, and preferably is driven at a speed in coordination with other pre and post processing equipment within an overall in-line food processing system. For example, the apparatus of the invention may be supplied with food products from a batter machine for coating within machine 10. Upon exit from machine 10, the coated food product can be introduced directly into a cooking stage, whether within a large scale food processing oven, frying apparatus or the like, or to freezing or other processing steps.

The characteristics of the product conveyor system 14 and carrier conveyor system 35 allow formation of the tumble zones or chambers 42 within the tumble coating zone 18 of apparatus 10. The product conveyor system 14 and the carrier conveyor system 35 can operate together in various modes of operation to achieve various results for different applications. In operation, as food products enter the machine 10 by being deposited onto the food product input zone 16 of the food product conveyor, the conveyor belt within section 16 will remain taut, either through tension provided by rollers 48 and 50, or alternatively by means of a support plate underlying the input zone 16, or a combination of both roller tensioning and support from beneath. Neither roller 48 nor roller 50 are part of the carrier conveyor system 35 and neither roller is affixed to the carrier conveyor drive chains 36. As the belt 14 moves along its path from left to right as shown in FIG. 2, the food product pieces deposited on the belt 14 move beyond roller 50, at which point the previous support is no longer provided. As a result, the belt 14 can sag between roller 50 and sprocket 38 associated with the carrier conveyor system 35. As previously mentioned, the drive chains 36 of carrier conveyor system 35 are driven to in turn drive the plurality of rollers 40. The rollers 40 in turn include means to engage the main product conveyor 14 at a point adjacent the first, upper sprocket 38, to again provide support for belt 14 at this location. The belt 14 will sag in a catenary fashion between roller 50, which is fixed in position, and one of the rollers 40, which is moving in the same direction as the belt along with carrier conveyor system 35. In a first preferred operation and embodiment, the movement of the carrier conveyor system 35 from the left to the right in FIG. 2 will be substantially similar or equivalent to the movement of the product conveyor belt 14. The movement of the carrier conveyor system 35 causes the rollers 40 to rotate relative to the movement of the conveyor system to produce a plurality of pockets 52 within the main product conveyor 14 between the spaced apart rollers 40. The pockets 52 are formed along the upper length of the carrier conveyor system 35 as shown in FIG. 2. As each of the catenary sags forms in the belt between roller 50 and one of the rollers 40, the pieces of food product positioned on belt 14 and entering that portion of the belt 14 will tumble by gravity to the bottom of the catenary sag 52. The size of the tumble chambers 42 may vary for different applications or throughput requirements. Products discharged sequentially onto the belt may end up in the same tumble chamber 42 being formed by the catenary sags 52 of the belt 14 as it moves allowing large quantities of products to be processed. As the carrier conveyor system 35 continues its movement, the roller 40 to which the belt 14 has engaged itself continues to move away from roller 50 and additional pieces may be captured in the tumble chamber 42 as it is formed. A succeeding roller 40 which is also part of the carrier conveyor system moves into position between roller 50 and sprocket 38, at which time one of the tumble chambers 42 is formed. Each tumble chamber 42 is therefore comprised of the belt 14 sagging in a catenary manner between roller 50 and sprocket 38 and the side walls of the device. Coating material may be charged to the tumble chamber 42 as it is being formed by conventional means for adding a charge of coating material from hopper 20 (FIG. 1). Alternatively, coating material may be added after the tumble chamber 42 is completely formed, although it is preferred to add the coating material to maximize contacting time between the product pieces and the coating material. For example, coating material could be applied to conveyor 14 in association with product in-feed section 16 such that products are positioned directly on a bed of coating material upon being deposited on conveyor 14. It may also be necessary in some applications to make further additions of coating material to the tumble chambers 42 as they move across the processing or tumble coating zone 18. It will, of course, be understood that as a further roller 40 comes into position between roller 50 and sprocket 38, a further tumble chamber 42 will form between rollers 50 and sprocket 38, and further tumble chambers 42 will continue to form in a continuous manner.

In operation, the rollers 40 can be carried or driven by the carrier conveyor system 35. In a first mode of operation, the rollers 40 are carried by the conveyor system 35, and move at a speed substantially equal to the peripheral speed of the sprockets 46 disposed on their ends engaged with chain 36. The rollers 40 rotate in a reverse manner as the conveyor 14 is moved through the processing zone 18. The reverse rotation of the rollers creates the pockets 52 as conveyor 14 is moved through the machine. The tumble chambers 42 as formed then allow the products introduced therein to be continuously tumbled as the conveyor 14 is moved through zone 18. This tumbling action provides significant and important processing characteristics within each of the tumble chambers 42, and allows a coating appearance and texture which emulates "homestyle" breading for example.

As conveyor 14 moves through the processing zone 18, the pockets 52 are correspondingly moved along causing continuous tumbling of products therein. As seen in FIG. 4, the processing or tumbling zone 18 is preferably split into upper and lower zones 60 and 62 by means of a dividing support plate 64. The tumble chambers 42 are formed in the upper zone 60 of the tumble coating zone 18, with the support plate 64 providing support to the individual chambers 42 as they travel along the length of the zone 18. The lower zone 62 provide return path for the carrier conveyor system 35. If a previous conveyor 14 is used, coating material introduced into pockets 52 could migrate through the conveyor and not be carried along within the pockets 52. An amount of coating material could be provided in the upper zone 60 so as to drag the chambers 42 through the coating to continuously expose the products within the chambers 42 as they move through zone 18. The conveyor 14 could be constructed to have sifting holes formed therein, allowing coating material to be partially carried and simultaneously sifted by the belt 14. Sifting holes 57 (shown in FIG. 2) could also be provided in the plate 64 to allow coating to fall therethrough into lower chamber 62 for recirculation. It may also be desirable to carry coating along with the conveyor as it moves through zone 18 so that it can be discharged to zone 62 for recirculation to a feed hopper. As shown in FIG. 2, the carrier conveyor system 35 could be utilized to carry a trailing plow type of system 55 which would trail each of the formed pockets 52. The system 55 will catch and move coating or breading material forward within chamber 42 and may also be configured to circulate coating material back onto the tops of products within chamber 42 to enhance the process. Other suitable or equivalent arrangements to carry coating material along with a conveyor of this type are contemplated in the invention.

The completely formed tumble chambers 42 will move across the machine until each of the tumble chambers 42 nears the product discharge zone 17, which is defined by rollers 66 and 68. These rollers are very similar to rollers 48 and 50 at the input zone 16, since the belt 14 is held taut between them and the catenary sag is not permitted. As a tumble chamber 42 approaches the discharge zone, the path of the carrier conveyor system 35 drops, slowly taking roller 40 out of contact with the product conveyor belt 14. As this is happening, the tumble chamber 42 begins to unform in the reverse manner to which it was formed. The driven product conveyor 14 is continuously moving at the discharge zone 17 so as to unmake the pocket 52 at a rate such that when roller 42 reaches the release point and drops away from belt 14, the pocket 52 is unmade, and the next pocket is exposed for initiating its unmaking. The operation of the machine thus creates slack in the conveyor 14 at the front end of zone 18 to make pockets 52, and removes the slack at the discharge end of zone 18. This process is performed continuously to make and unmake pockets 52. As the amount of catenary sag decreases to zero in unmaking of a pocket 52, the tumbling action ceases and the now-coated pieces of food product ride the belt 14 into the discharge zone 17. In this section, the taut belt and/or support beneath the belt 14 move the now-coated food product pieces to the end of the machine, where they may be removed or transferred by another conveyor belt for further processing. Coating material on the belt at the discharge end of the device may be recaptured by conventional means and recycled through the device to the coating charging means, where it may be charged to a new tumble chamber being formed.

Figure 5:
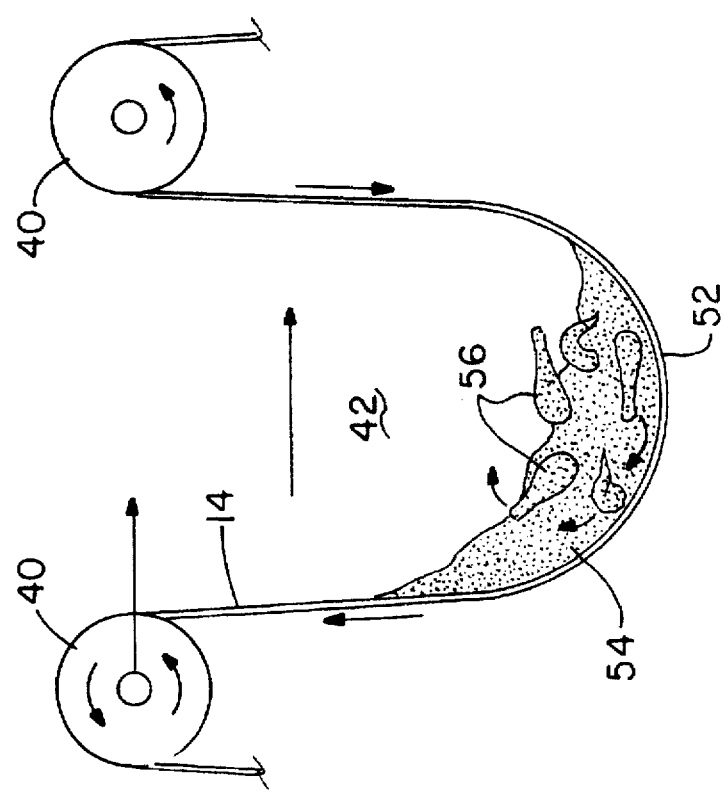
FIG. 5 is an enlarged schematic representation of a tumble chamber and the process of coating products therein.

As shown with respect to FIG. 5, the tumbling action of the food products within the tumble chambers 42 produces a coating on food products which is significantly improved over that which was obtainable by conventional conveyor-type coating operations. The food products 56 are maintained within a relatively large volume of coating material 54 within each of the coating chambers 42, while being tumbled therein. The long residence time within the coating material 54 as well as the tumbling action provides a very uniform and thick coating of material, with an appearance and texture which simulates a drum or hand coated product. This is achieved in a continuous process which allows high production rates to be maintained, while providing the described advantages.

Figure 6:
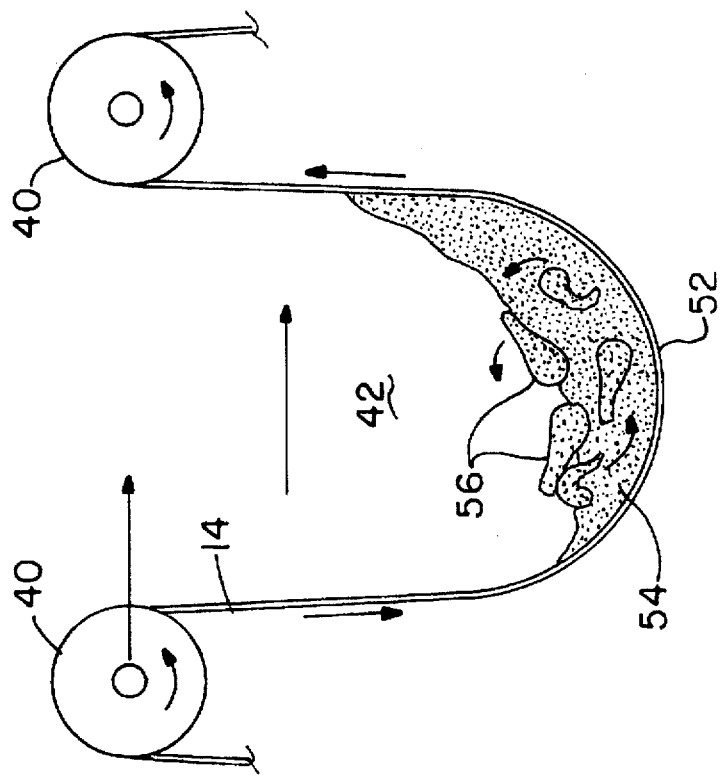
FIG. 6 is an enlarged schematic representation of a tumble chamber showing operation of an alternative embodiment of the invention.

In an alternative embodiment as shown in FIG. 6, the operation of the carrier conveyor 35 in conjunction with belt 14 is modified to achieve different operating characteristics. An alternative mode of operation can operate the carrier conveyor system 35 such that the rollers 40 thereof are moved through zone 18 at a differential speed relative to the speed of product conveyor 14. This in turn will cause conveyor 14 to be continuously moved through each of the formed pockets 52 as the pockets 52 move through zone 18. The rollers 40 may be driven at a predetermined speed to control the speed at which the product conveyor 14 moves through the pockets 52. In FIG. 6, this differential speed between the carrier conveyor system 35 and product conveyor 14 causes movement of belt 14 as shown by the arrows. Movement of belt 14 relative to one of the respective tumble chambers 42 causes any coating material as well as any products within a respective tumble chamber 42 be urged toward the forward end of the chamber 42 as shown. The characteristics of the conveyor 14 are such that the coating material 54 within chamber 42 along with any product 56, follow the upward leading edge of the product belt 14 as it moves through chamber 42 by friction to create a rolling and tumbling action within the chamber 42. Thus, once completely formed, each tumble chamber 42 will continue to have the product conveyor belt 14 moving through it at a faster speed than the movement of the carrier conveyor 35, so the coating material 54 and pieces of food product 56 contained in the tumble chamber 42 will continue to be tumbled in the coating material 54 contained in the tumble chamber 42. Since the number of pieces in any individual tumble chamber may be controlled by selecting belt speed and feed speed of the products, the products will not be lifted far before they tumble within the chamber 42, so as to minimize the damage done to individual food product pieces both from interaction with other pieces and with the tumble chamber itself.

Similarly, the rollers 40 could be moved through zone 18 at a speed which is faster than the speed of conveyor 14 to cause relative movement between pocket 52 and belt 14 in an opposite direction to that shown in FIG. 6, wherein a similar coating and tumbling action would occur in the chambers 42, but on the opposite side of the chamber 42. In this embodiment, the unmaking of the pockets 52 may require that the elevation of the belt 14 be lowered to accommodate the differential speed between the conveyor 35 and belt 14, so that the pocket is unmade slowly as it is released from conveyor 35 and drops to a point below sprocket 38. The discharge from the machine may then be from this lower position or the conveyor 14 could be directed upwardly to again be at the same height as the inlet for example.

It is also a feature of the invention that the rollers 40 could be rotatably driven by means of chain 36 in conjunction with movement along zone 18 by means of conveyor system 35. In this embodiment, the rollers 40 may be rotatably driven at a faster or slower speed, and will function to drag the product conveyor 14 through the formed pockets 52 causing a tumbling action therein. This arrangement would allow flexibility in operating the machine in alternative modes for different applications or to achieve different coating characteristics.

Although the invention has been described with reference to a particular preferred embodiment thereof, it should be recognized that various changes and modifications may be made without departing from the spirit and scope of the invention as defined in the appended claims.

What is claimed is:

1. An apparatus for tumble coating of products comprising,
    a housing defining a product conveyor path and having a product conveyor for conveying products along the conveyor path provided therein, said housing having an input end and a discharge end;
    a carrier conveyor provided along said product conveyor path and a pocket forming mechanism which in conjunction with said carrier conveyor and said product conveyor forms at least one tumble chamber along said conveyor path in said product conveyor,
    a coating supply to supply a charge of coating material at least to said at least one tumble chamber, wherein said at least one tumble chamber receives and carries said products positioned on said product conveyor in a processing zone as said product conveyor travels between said input and discharge ends wherein said coating material coats said products.

2. The tumble coating apparatus of claim 1, wherein said product conveyor is a conveyor belt supported within said housing and including a drive mechanism for driving said conveyor belt from said input end to said discharge end thereof.

3. The tumble coating apparatus of claim 1, wherein, said pocket forming mechanism includes at least a pair of spaced apart support rollers and said at least one tumble chamber is formed by a portion of said product conveyor sagging between said pair of support rollers.

4. The tumble coating apparatus of claim 1, wherein, said pocket forming mechanism includes a plurality of support rollers having opposed ends which are carried by support members, said rollers engaging said product conveyor and being moved along said conveyor path by said support members.

5. The tumble coating apparatus of claim 4, wherein, said rollers rotate in a reverse direction to said movement along said conveyor path, with the speed at which said rollers are moved along said conveyor path being substantially the same as the speed of rotation of said rollers, wherein the reverse rotation of said rollers forms said at least one tumbling chamber.

6. The tumble coating apparatus of claim 4, wherein, said rollers rotate along with movement along said conveyor path, with the speed at which said rollers are moved along said conveyor path being slower than the speed of rotation of said rollers, wherein the differential rotation of said rollers causes said product conveyor to move relative to said at least one chamber.

7. The tumble coating apparatus of claim 4, wherein, said rollers rotate along with movement along said conveyor path, with the speed at which said rollers are moved along said conveyor path being faster than the speed of rotation of said rollers, wherein the differential rotation of said rollers causes said product conveyor to move relative to said at least one chamber.

8. The tumble coating apparatus of claim 4, wherein said plurality of rollers are rotatably driven as they are moved along said conveyor path.

9. The tumble coating apparatus of claim 1, wherein said carrier conveyor includes a plurality of support rollers driven by said carrier conveyor which engage said product conveyor and form said at least one tumble chamber in said product conveyor between an adjacent pair of said support rollers.

10. The tumble coating apparatus of claim 1, wherein a plurality of said tumble chambers are formed along said product conveyor path in a processing zone, wherein said products are continuously moved around within each of said chambers within said processing zone for coating thereof.

11. The tumble coating apparatus of claim 1, wherein said carrier conveyor comprises a pair of spaced apart closed chain members which carry a plurality of support rollers therebetween, said rollers being spaced apart at predetermined intervals along said conveyor path wherein a plurality of said chambers are formed between pairs of said support rollers.

12. The tumble coating apparatus of claim 1, wherein said product conveyor is made of a previous material.

13. The tumble coating apparatus of claim 1, wherein said carrier conveyor includes means associated with said at least one tumble chamber to catch and move coating material along said conveyor path as said product conveyor moves along said path.

14. An apparatus for coating of products comprising,
    a housing defining a product conveyor path and having a product conveyor for conveying products along the conveyor path provided therein, said housing having a width;

a carrier conveyor provided along said product conveyor path and a forming mechanism which in conjunction with said carrier conveyor and said product conveyor forms at least one tumble chamber along said conveyor path in said product conveyor, said at least one tumble chamber having an axis extending along said width of said housing; and a coating supply to supply a charge of coating material at least to said at least one tumble chamber to coat said products.

* * * * *